United States Patent [19]

Bevan

[11] Patent Number: 4,859,019

[45] Date of Patent: Aug. 22, 1989

[54] FIBER OPTIC TELEMETRY SYSTEM

[75] Inventor: Dennis P. Bevan, Alhambra, Calif.

[73] Assignee: Litton Systems, Inc., Beverly Hills, Calif.

[21] Appl. No.: 167,513

[22] Filed: Mar. 14, 1988

[51] Int. Cl.4 .............................. G02B 6/28; H04B 9/00
[52] U.S. Cl. ................................ 350/96.16; 350/96.15; 455/610
[58] Field of Search .......................... 350/96.15, 96.16; 455/610, 611, 612

[56] References Cited

U.S. PATENT DOCUMENTS

| 4,357,606 | 11/1982 | Fortescue | 350/96.16 X |
| 4,671,608 | 6/1987 | Konishi | 350/96.16 |
| 4,708,424 | 11/1987 | Marhic | 350/96.16 |
| 4,727,601 | 2/1988 | Konishi | 350/96.16 X |
| 4,730,888 | 3/1988 | Darcie et al. | 350/96.16 |

Primary Examiner—William L. Sikes
Assistant Examiner—Akm E. Ullah
Attorney, Agent, or Firm—Elliott N. Kramsky

[57] ABSTRACT

A fiber optic telemetry system includes an input coupler having a terminal connected to the input of the telemetry system. An output coupler has one of its terminals connected to the output of the telemetry system. A first interferometer or sensor has its input terminal connected to the output terminal of the input coupler, and has its output terminal connected to the output coupler. A third coupler has one of its input terminals connected to the second output of the input coupler, and has a second input terminal connected to the second input of the output coupler. Second and third sensors have their input terminals connected to the output terminals of the third coupler.

8 Claims, 3 Drawing Sheets

FIBER OPTIC TELEMETRY SYSTEM

BACKGROUND

1. Field of the Invention

This invention relates to fiber optic telemetry systems. More particularly, the present invention pertains to an optically multiplexed sensor and coupler arrangement in a telemetry system for improved efficiency and reduced cost.

2. Description of the Prior Art

The fiber optic telemetry systems with which the present invention is concerned can be categorized in two general types or designs: The full-ladder and the half-ladder telemetry systems. While each one of these two conventional telemetry systems may be suitable for particular applications, none has proven to be completely satisfactory.

For illustration purposes, a conventional full-ladder telemetry system is shown in FIG. 1. As will be explained later in greater detail, while the full-ladder telemetry system presents a relatively acceptable throughput level, it suffers from several drawbacks. In this regard, each interferometer or sensor in the full-ladder telemetry system requires two couplers, one coupler for splitting the input signal, and another output coupler for combining the split signal. Furthermore, the full-ladder telemetry system requires a relatively large amount of optical fibers and a relatively large number of splices in order to interconnect the constituent components. Thus, the increased number of the components in the full-ladder telemetry system increases its cost and limits its application.

For illustration purposes, a conventional half-ladder telemetry system is shown in FIG. 2. As will be explained later in greater detail, while the half-ladder telemetry system provides a relatively efficient distribution among its sensors, its throughput is substantially low. Thus, the conventional half-ladder telemetry system is severely limited as to the number of constituent sensors or interferometers in that an increase in the number of sensors can reduce the throughput signal to an undesirably low level.

Therefore, it would be highly desirable to have a new and improved sensor and coupler arrangement in a telemetry system for improved efficiency and reduced cost.

SUMMARY AND OBJECTS OF THE INVENTION

The foregoing and additional shortcomings of the prior art are addressed and overcome by the present invention that provides a novel fiber optic telemetry system. The inventive telemetry system having input and output terminals includes a first optical coupler having at least one input and two output terminals, the input terminal being connected to the input terminal of the system. A second optical coupler has two input terminals and at least one output terminal, the output terminal being connected to the output terminal of the system. A first sensor has one input terminal and one output terminal, the input terminal being connected to the output terminal of the first coupler and the output terminal being connected to a first one of the input terminals of the second coupler.

A third optical coupler that has two input terminals and two output terminals, one of the input terminals being interconnected between the output terminal of the first coupler and the second input terminal of the third coupler being connected to the second input of the second coupler. A second sensor has one input/output terminal that is connected to a third terminal of the third coupler. A third sensor has one input/output terminal that is connected to a fourth terminal of the third coupler.

The foregoing and additional advantages and features of the present invention will become apparent from the detailed description of the invention that follows. This description is accompanied by a set of drawing figures. Numerals point out the various features of the invention in the figures and in the detailed description, like numerals referring to like features throughout.

DETAILED DESCRIPTION

Figure 1:
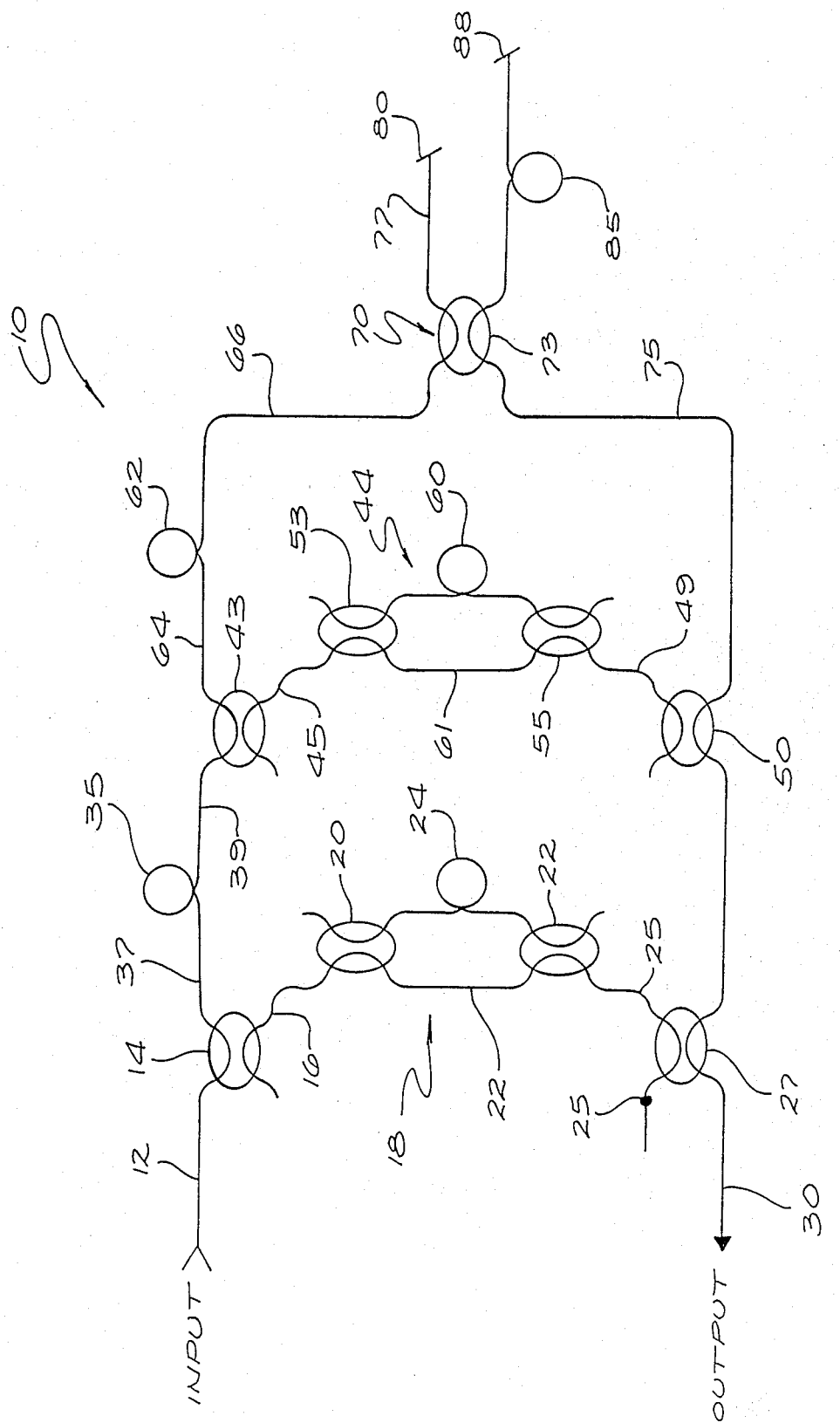
FIG. 1 is a schematic view of a conventional full-ladder telemetry system.

Turning now to the drawings, FIG. 1 is a schematic view of a conventional full-ladder telemetry system 10 which includes an input terminal 12 that is optically coupled to a light source such as a laser or LED (not shown). A coupler 14 has its input connected to the terminal 12 and its first output terminal 16 connected to a Mach-Zehnder type interferometer 18.

The interferometer 18 includes a pair of interconnected identical couplers 20 and 22 for defining a reference arm 23 and a sensing arm 24. The interferometer 18 further has its output terminal 25 connected to the first input terminal of a coupler 27, which in turn has its output terminal 30 connected to the output terminal of the telemetry system 10.

For illustration purposes, each one of the couplers 14 and 27 has a splitting ratio of one-third ($\frac{1}{3}$), while each one of the couplers 20 and 22 has a splitting ratio of one-half ($\frac{1}{2}$). Thus, the total throughput at the output terminal 30 corresponding to the input signal I is I/18.

A delay spool 35 can be optionally connected intermediate to the second output terminal 37 of the coupler 14 and the input 39 of a coupler 43. A Mach-Zehnder type interferometer 44 is connected intermediate to the first output 45 of the coupler 43 and a first input 49 of a coupler 50. The interferometer 44 is similar to the interferometer 18 and includes a pair of identical interconnected couplers 53 and 55, which define a sensing arm 60 and a reference arm 61. For illustration purposes, each one of the couplers 43, 50, 53 and 55 has a splitting ratio of one-half ($\frac{1}{2}$). Thus, the total throughput at the output terminal 30 corresponding to the input signal I is I/18.

A delay spool 62 can be optionally connected intermediate the second output 64 of the coupler 43 and the input 66 of a Michelson type interferometer 70. The interferometer 70 includes a coupler 73 which has its output terminal 75 connected to the second input of the coupler 50.

The interferometer 70 includes a reference arm 77, which terminates in a reflective mirrored fiber end 80, and a sensing arm 85 which similarly terminates in a reflective mirrored fiber end 88. For illustration purposes, the coupler 73 has a splitting ratio of one-half (½). Thus, a total throughput at the output terminal 30 corresponding to the input signal I coupled to the interferometer 70 is I/18.

Figure 2:
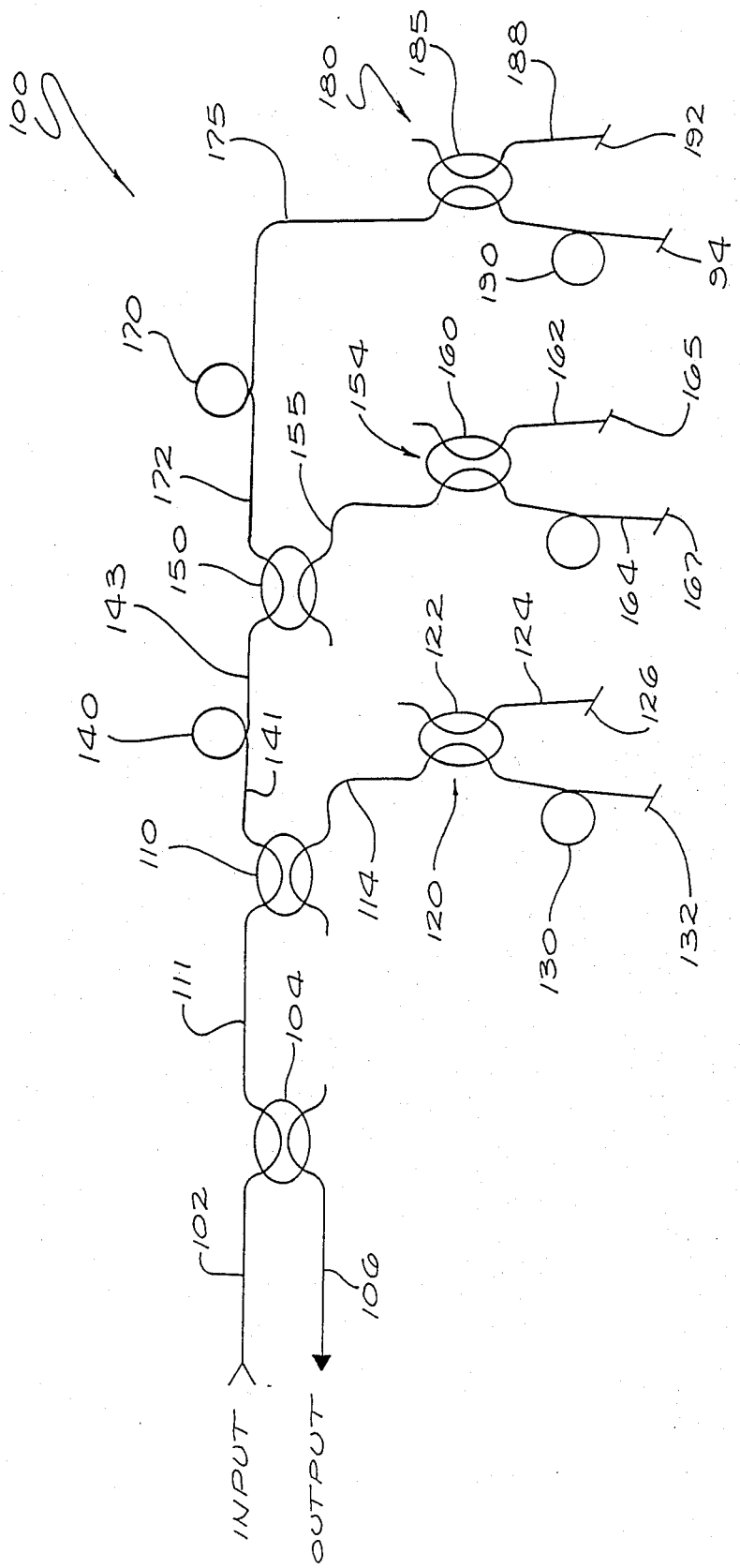
FIG. 2 is a schematic view of a half-ladder telemetry system.

Turning now to the drawings, FIG. 2 is a schematic view of a conventional half-ladder telemetry system 100. The system 100 includes an input terminal 102 which is optically coupled to a light source (not shown). The coupler 104 has its input connected to the terminal 102 and has its output connected to the output terminal 106 of the telemetry system 100.

A coupler 110 has its input terminal 111 connected to the output terminal of the coupler 104. The first output terminal 114 of the coupler 110 is connected to the input of a Michelson type interferometer or sensor 120. The interferometer 120 includes a coupler 122 having a reference arm 124 which terminates in a reflective mirrored fiber end 126. The interferometer 120 further includes a sensing arm 130 which terminates in a reflective mirrored fiber end 132.

For illustration purposes, each one of the couplers 104 and 122 has a splitting ratio of one-half (½), while the coupler 110 has a splitting ratio of one-third (⅓). Thus, the total throughput at the output terminal 106 corresponding to the input signal I is I/72.

A delay spool 140 can optionally be connected intermediate the output 141 of the coupler 110 and the input 143 of a coupler 150. A Michelson type interferometer 154 has its input connected to the output terminal 155 of the coupler 150. The interferometer 154 includes a coupler 160, a reference arm 162, and a sensing arm 164. The reference arm 162 terminates in a reflective mirrored fiber end 165, while the sensing arm 164 terminates in a reflective mirrored fiber end 167.

For illustration purposes, each one of the couplers 150 and 160 has a splitting ratio of one-half (½). Thus, the total throughput at the output terminal 106 corresponding to the input signal I is I/72.

A delay spool 170 can optionally be connected intermediate a second output terminal 172 of the coupler 150 and an input terminal 175 of a Michelson type interferometer 180. The interferometer 180 includes a coupler 185, a reference arm 188, and a sensing arm 190. The reference arm 188 terminates in a reflective mirrored fiber end 192, while the sensing arm 190 terminates in a reflective mirrored fiber end 194.

For illustration purposes, the coupler 185 has a splitting ratio of one-half (½). Thus, the total throughput at the output terminal 106 corresponding to the input signal I is I/72.

Figure 3:
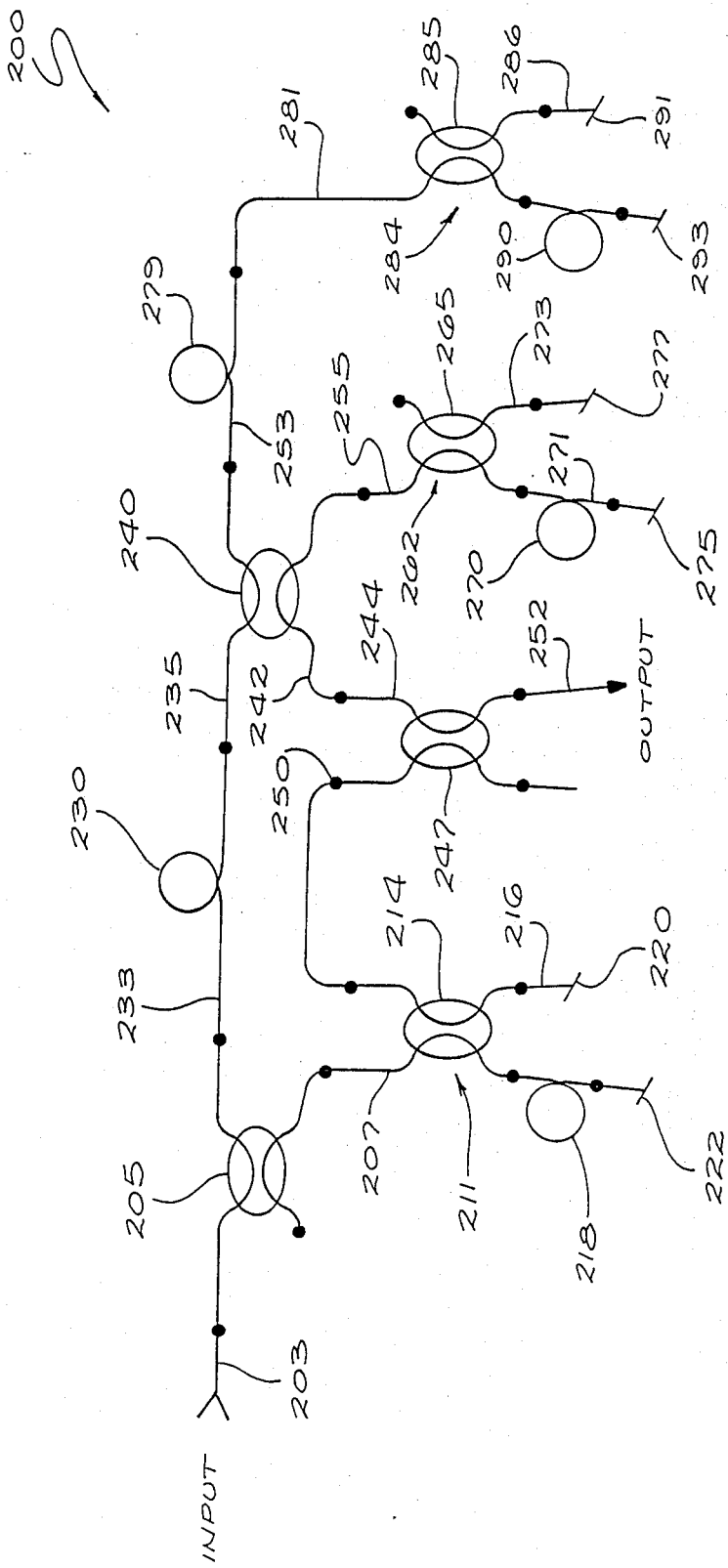
FIG. 3 is a schematic view of a telemetry system which is arranged in accordance with the present invention

Turning now to FIG. 3, there is illustrated a fiber optic telemetry system 200 which is constructed in accordance with the present invention. As will be demonstrated hereinafter in greater detail, the arrangement of the constituent components of the system 200 combines the efficiency of the conventional full-ladder telemetry system and the cost effectiveness of the conventional half-ladder telemetry system 100.

The telemetry system 200 includes an input terminal 203 to which the input of an input coupler 205 is connected. The coupler 205 has its first output 207 connected to the input of a Michelson type interferometer 211. The interferometer 211 includes a coupler 214, a reference arm 216, and a sensing arm 218. Each one of the reference arm 216 and the sensing arm 218 terminates in a reflective mirrored fiber end such as the fiber ends 220 and 222, respectively.

For illustration purposes, the coupler 205 has a splitting ratio of one-third (⅓) while the coupler 214 has a splitting ratio of one-half (½). A delay spool 230 can optionally be connected intermediate a second output 233 of the coupler 205 and a first terminal 235 of a coupler 240.

The coupler 240 has a second terminal 242 connected to a first input terminal 244 of an output coupler 247. The coupler 247 has its second input terminal 250 connected to the output of the coupler 214. The coupler 247 further has its output terminal 252 connected to the output of the telemetry system 200.

A second Michelson type interferometer 262 has its input connected to a third terminal 255 of the coupler 240. The interferometer 262 includes a coupler 265, a sensing arm 271, and a reference arm 273. Each one of the reference arm 273 and the sensing arm 271 terminates in a reflective mirrored fiber end 275 and 277, respectively.

A delay spool 279 can optionally be connected intermediate a fourth terminal 253 of the coupler 240, and an input 281 of a Michelson interferometer 284. The interferometer 284 includes a coupler 285, a reference arm 286 and a sensing arm 290. Each one of the reference arms 286 and the sensing arm 290 terminates in a reflective mirrored fiber end such as the fiber ends 291 and 293, respectively.

For illustration purposes, each one of the couplers 205 and 247 has a splitting ratio of one-third (⅓) Furthermore, each one of the couplers 214, 240, 265 and 285 has a splitting ratio of one-half (½). The following table summarizes the numeral reference numbers of selected terminals of the telemetry system 200 and the corresponding intensity levels for each one of the interferometers 211, 262 and 284. The input level at the input terminal 203 is I and the intensity levels at the terminals 207, 233 and 235 are I/3, 2I/3, and 2I/3, respectively.

TABLE

| Terminal Ref. No. | Interferometer 211 | Interferometer 262 | Interferometer 284 |
|---|---|---|---|
| 250 | I/6 | — | — |
| 255 | — | I/6 | — |
| 253 | — | — | I/6 |
| 242 | — | I/12 | I/12 |
| 252 (output) | I/18 | I/18 | I/18 |

As a result, the telemetry system 200 offers the same throughput levels for the interferometers 211, 262 and 284 as those obtained with the conventional full-ladder telemetry system 10. Furthermore, the telemetry system 200 utilizes substantially the same number of couplers and the same quantity of optical fibers as those utilized in the conventional half-ladder telemetry system 100. Thus, by employing the inventive arrangement of couplers and sensors, a substantial economy can be achieved while preserving the efficiency of the telemetry system 200.

While this invention has been described in its preferred embodiment, its scope is not limited thereto. Rather, it is limited only insofar as defined in the following set of claims and such scope includes all equivalents thereof.

What is claimed is:

1. A fiber optic telemetry system an arrangement having input and output terminals comprising, in combination:

(a) a first optical coupler having at least one input and two output terminals, said input terminal being connected to the input terminal of said telemetry system;

(b) a second optical coupler having two input terminals and at least one output terminal, said output terminal being connected to the output terminal of said telemetry system;

(c) a first sensor having one input terminal and one output terminal, said input terminal being connected to said output terminal of said first coupler and said output terminal being connected to a first one of said input terminals of said second coupler;

(d) a third optical coupler having two input terminals and two output terminals, one of said input terminals being interconnected between said output terminal of said first coupler and said second input terminal of said third coupler being connected to said second input of said second coupler;

(e) a second sensor having one input/output terminal, said input/output terminal being connected to a third terminal of said third coupler;

(f) a third sensor having one input/output terminal, said input/output terminal being connected to a fourth terminal of said third coupler.

2. A fiber optic telemetry system as defined in claim 1 wherein each one of said first, second and third sensors includes an optical interferometer.

3. A fiber optic telemetry system as defined in claim 2 wherein said first interferometer is a Michelson type interferometer.

4. A fiber optic telemetry system as defined in claim 3 said second interferometer is a Michelson type interferometer.

5. A fiber optic telemetry system as defined in claim 4 wherein said third interferometer is a Michelson type interferometer.

6. A fiber optic telemetry system as defined in claim 5 wherein:

(a) said first optical coupler has a splitting ratio of one-third ($\frac{1}{3}$);

(b) said second coupler has a splitting ratio of one-third ($\frac{1}{3}$);

(c) said third coupler has a splitting ratio of one-half ($\frac{1}{2}$);

(d) said first interferometer includes a coupler having a splitting ratio of one-half ($\frac{1}{2}$);

(e) said second interferometer includes a coupler having a splitting ratio of one-half ($\frac{1}{2}$); and (f) said third interferometer includes a coupler having a splitting ratio of one-half ($\frac{1}{2}$).

7. A fiber optic telemetry system as defined in claim 5 further including a delay spool arranged to accept an output of said first coupler and to provide an input to said third coupler.

8. A fiber optic telemetry system as defined in claim 5 further including a delay spool arranged to accept an output of said third coupler and to provide an input to said second sensor.

* * * * *